Nov. 21, 1933.     H. H. VALPEY     1,935,678
CLUTCH GAUGE
Filed April 4, 1932
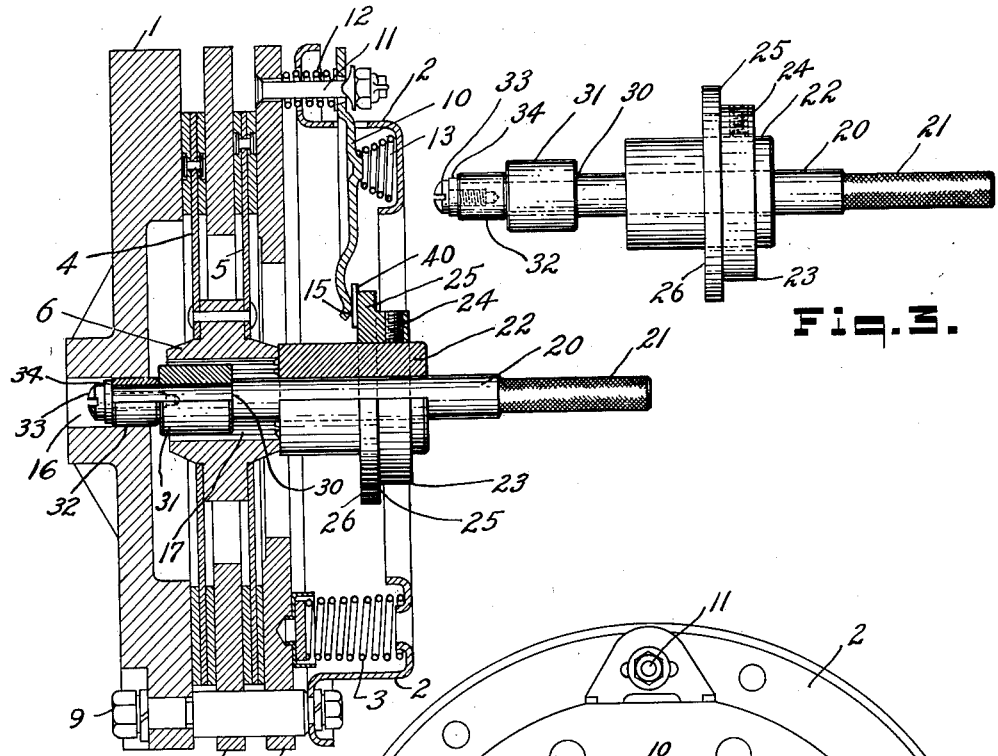
Fig.3.
Fig.1.
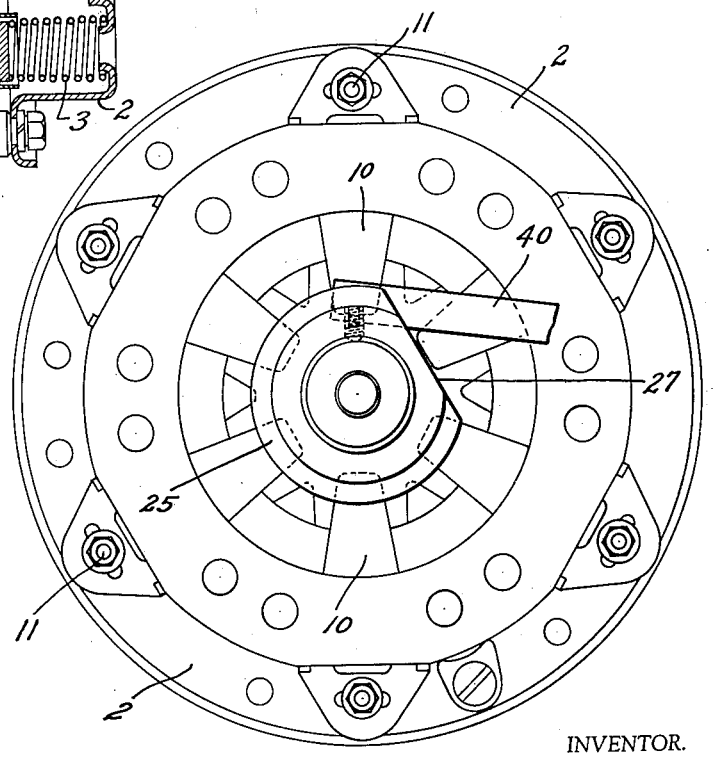
Fig.2.
INVENTOR.
Henry H. Valpey
BY
Barnes, Kisselle & Laughlin
ATTORNEYS.

Patented Nov. 21, 1933

1,935,678

UNITED STATES PATENT OFFICE 1,935,678

CLUTCH GAUGE

Henry H. Valpey, Dearborn, Mich., assignor to Long Manufacturing Company, Detroit, Mich., a corporation of Michigan Application April 4, 1932. Serial No. 603,011

8 Claims. (Cl. 33—181)

This invention relates to a tool particularly useful in adjusting, reconditioning, and initial assemblying of clutches. The invention is directed particularly toward the provision of a tool of simple rugged construction designed for use particularly with clutches in automotive vehicles.

The objects of the invention are to provide a tool of such particular design that it may be piloted or centered on the axial center of rotation by means of employing a bearing member or other part of one of the clutch elements involved. As these bearing members may have different sizes in different vehicles, so may the tool be provided with a plurality of sleeve like members for association with such bearings. The invention also aims to provide a tool which may serve to center, or hold in center position, the driven disk of a clutch while other gauging operations be performed. These gauging operations are those, principally, of properly adjusting and positioning the clutch throw-out levers so that such levers may be in an accurate operative position with their ends to be engaged by a clutch throw-out device positioned all substantially in a common plane.

Fig. 1 shows a tool constructed in accordance with the invention with parts cut away and parts in section illustrating the same in working position as regards a clutch.

Fig. 2 is an end view looking from the right hand side of Fig. 1.

Fig. 3 is a side elevation of the tool.

The clutch construction will first be described, as the function and operation of the tool may be better understood if the clutch structure with which it is to be employed is understood. The flywheel of an engine, such as an internal combustion engine, is illustrated at 1, and a clutch cover plate is illustrated at 2. Packing springs 3 are backed up by the cover plate and urge the driving and driven members of the clutch together in packed relation. In the present clutch there are two driven disks 4 and 5 mounted upon a hub 6, and two pressure rings 7 and 8. The flywheel, pressure rings and cover plate, may be united in driving relation by driving studs 9 and each constitutes a clutch driving member. Clutch throw-out levers 10 are provided which may pass through apertures in the cover plate and fulcrum therein and connect to studs 11 mounted in pressure ring 8. The springs 12 and 13 are merely light springs for preventing rattles and for holding the parts snugly against each other. The levers may have suitably formed or curved ends 15 adapted to be engaged by a movable throw-out member (not shown). When such member is shifted from right to left, as Fig. 1 is viewed, the levers are rocked and the pressure plate 8 retracted against the action of the packing springs 3, and the clutch is disengaged. There may be any number of levers, and as shown in Fig. 2, there are six in the present instance.

The gauge tool is designed for use either in reconditioning, readjusting or reassembling a clutch, or for use in initial installation and assembly. The tool is one which may serve to center the hub 6 of the driven member and for adjusting the levers 10 to properly locate the levers and for positioning the inner ends of the levers substantially in a common plane.

The tool is of simple construction and is designed to be used with the clutch parts above described before the driven shaft is placed in the assembly. It will be understood that the driven shaft may be piloted at its inner end in a bearing 16 of the flywheel, and it may connect to the hub 6 through the means of splines shown at 17 on the interior surface of the hub.

The tool may comprise a central axis member 20 which may be in the form of a rod and may have a knurled handle 21. Slidably mounted upon this tool is a block member or body member 22, and carried by this block member is a gauge member 23. This member 23 may be adjustably located upon the member 22 through the means of a set screw 24, and the member may advantageously have a flange 25 providing a gauging surface 26. This flange, as shown in Fig. 2, is cut away, preferably on a chord, as illustrated at 27, the purpose of which will presently appear.

The member 20 is designed to be disposed on the axial center of the parts, and for this purpose it may be piloted in the bearing 16. The member 20 may be reduced in cross section at one end so as to form a shoulder 30, and sleeve like members 31 and 32 may be slipped over the reduced part and held thereon by means of a screw 33 and washer 34. The sleeve 32 may be inserted in the bearing 16 and thus serve to center the tool on the axis of rotation of the parts to be adjusted. The sleeve 31 is designed to nicely fit the interior of the hub 6 thus to center and hold the hub and its driven disk or disks on center.

It will be appreciated that clutches are made in a good many sizes which are largely determined by the size and type and power of the automotive vehicle in question, and that the pilot bearings in the flywheel and internal diameters of the hub vary. Accordingly, the tool when supplied to a user may include a desired number of extra sleeves 32 and 31, all designed to slip over the part 20 by having varying outside diameters to fit different clutch assemblies. A sufficient number of these sleeves may be supplied to make the tool capable of practically universal use in clutches of this general type. In conditioning a clutch, the operator must of course know what kind or type of a clutch he is dealing with, and from a chart or other source of information supplied by the manufacturer, may determine, for example, the correct distance or height for the inner ends of the levers from a fixed part as, for example, the edge of the hub 6. This distance is then measured upon the body 22 and the member 23 adjusted so that the proper height for the levers of the clutch in question is substantially represented by the distance from the gauging face 26 to the inner end of the body 22. The tool may now be inserted, as shown in Fig. 1, and the member 22 pushed up against the hub unless it is prevented by the surface 26 striking lever ends. The levers may now be adjusted by manipulating the nuts on the ends of the studs 11, and while the member 22 is up against the hub 6 a feeler gauge or the like 40 may be inserted between one of the levers and the face 26. In order to facilitate insertion of the feeler gauge, the flange 26 may be severed on a chord, as illustrated in Fig. 2, and the gauge may be inserted in some such manner as illustrated. At the same time, it will be noted that the tool holds the hub 6 on the axial center.

Thus, all the clutch releasing lever ends may be positioned in a proper and substantially common plane. It will be appreciated how the tool may be used in an initial installation and how it may be used for reconditioning a clutch. After a clutch is properly assembled and adjusted the tool may be withdrawn and the driven shaft may be inserted.

The important features of the invention are that the tool is held centered by some fixed part of the mechanism, and while the bearing 16 is an advantageous structure from which to take the centering action, yet some other part may suffice. Similarly, the member 23 is to be properly adjusted, taking its position from some fixed part of the structure, which in the present instance is the edge of the hub 6, although the position may be taken from any other fixed part.

I claim:

1. A gauge tool for use with friction clutches comprising an axis member, a pilot member on the axis member adapted to fit into a member of the clutch for centering the axis member therein, a bearing member on the axis member adapted to fit within the hub of a clutch driven element for centering the same, an axially shiftable member carried by the axis member adapted to take a position by abutment against a fixed part in the clutch structure, a gauge on the slidable member for gauging clutch throw-out levers, and means for holding the gauge on said slidable member in adjusted position.

2. A gauge tool for use with clutch structures comprising, a rod like axis member, a bearing like pilot member on the rod adapted to center in a clutch member, an axially shiftable body member on the rod, an axially shiftable gauge on the body member, and means for holding the gauge fixed in adjusted position on the body member.

3. A gauge tool for use with clutch structures comprising, a supporting axis member adapted to be disposed on the axial center of clutch parts, a body member shiftable axially on the rod like member and adapted to abut a fixed part of the clutch construction, a gauge element axially shiftable on the body member, and means for holding the gauge element in adjusted position on the body member.

4. A tool substantially for the purpose described comprising a rod like axis member, a sleeve on the axis member for centering the same on the axial center of parts to be gauged, another sleeve on the rod like member for centering a clutch part, means for removably holding the sleeves on the rod like member, and an axially shiftable gauge element carried by the rod like member.

5. A tool substantially for the purpose described comprising a rod like axis member, a sleeve on the axis member for centering the same on the axial center of parts to be gauged, another sleeve on the rod like member for centering a clutch part, means for removably holding the sleeve on the rod like member, an axially shiftable body member on the rod like axis member, a gauge element shiftable upon the body member, and means for adjustably holding the gauge element on the body member.

6. A gauge tool for use with clutch structures having a driving member, a driven member with a hub, and clutch throw-out levers, comprising a rod like axis member, a removable sleeve thereon for fitting within the hub of the driven member, another removable sleeve thereon adapted to fit in a pilot bearing of the driving member for centering the rod on the axial center of the clutch parts, a shiftable block carried by the rod like member, a gauge member having a gauging face for cooperation with the clutch levers and carried by the block, and means for holding the gauge member in adjusted position on the block.

7. A gauge tool for use with friction clutches having driving and driven members and throw-out levers, comprising a rod like axis member, means for holding the axis member on the axial center of the clutch parts, a shiftable block carried by the axis member adapted to be positioned by abutment against a fixed part of the clutch, a movable flanged gauge member carried by the block, the flange of the gauge member having a gauge surface for cooperating with the clutch throw-out levers, means for holding the gauge member in various positions of adjustment on the block, said flange being of circular form for the most part and being relieved from its normal circular contour substantially on a chord of the circle whereby to facilitate insertion of a feeler gauge between a lever and the gauging surface of said member.

8. A gauge tool for use with friction clutches comprising an axis member, a pilot on the axis member adapted to fit into a member of the clutch for centering the axis member, a bearing member on the axis member adapted to fit within the hub of a clutch driven element for centering the same, an axially shiftable member carried by the axis member adapted to take a position by abutting against a fixed part in the clutch structure, and a gauge on the slidable member for engaging clutch throw-out levers.

HENRY H. VALPEY.